US008234672B2

(12) United States Patent
Morse et al.

(10) Patent No.: US 8,234,672 B2
(45) Date of Patent: Jul. 31, 2012

(54) METHOD AND SYSTEM TO CONTROL PLAYBACK OF DIGITAL MEDIA

(75) Inventors: Lee Morse, Sunnyvale, CA (US); Vincent Tong, Saratoga, CA (US); Chan Tur Wei, Singapore (SG)

(73) Assignee: Creative Technology Ltd, Singapore (SG)

( * ) Notice: Subject to any disclaimer, the term of this patent is extended or adjusted under 35 U.S.C. 154(b) by 0 days.

(21) Appl. No.: 10/654,338

(22) Filed: Sep. 2, 2003

(65) Prior Publication Data

US 2005/0076388 A1    Apr. 7, 2005

(51) Int. Cl.
*G06F 3/00* (2006.01)
*G06F 13/00* (2006.01)
*G06F 15/16* (2006.01)
*H04N 5/445* (2006.01)
*H04N 7/18* (2006.01)
*H04N 7/173* (2006.01)
*H04N 5/765* (2006.01)
*H04N 5/932* (2006.01)
*H04N 5/935* (2006.01)

(52) U.S. Cl. ........... 725/49; 725/37; 725/47; 725/48; 725/74; 725/86; 709/230; 709/231; 709/237; 386/200; 386/219

(58) Field of Classification Search .......... 725/141, 725/109
See application file for complete search history.

(56) References Cited

U.S. PATENT DOCUMENTS

| 5,515,052 | A | | 5/1996 | Darbee |
| 5,952,995 | A | | 9/1999 | Barnes |
| 6,104,334 | A | | 8/2000 | Allport |
| 6,128,653 | A | * | 10/2000 | del Val et al. ................. 709/219 |
| 6,157,377 | A | * | 12/2000 | Shah-Nazaroff et al. ...... 715/719 |
| 6,157,411 | A | * | 12/2000 | Williams et al. .............. 348/552 |
| 6,248,946 | B1 | * | 6/2001 | Dwek ............................ 84/609 |
| 6,407,779 | B1 | * | 6/2002 | Herz ............................. 348/734 |
| 6,463,465 | B1 | * | 10/2002 | Nieuwejaar ................... 709/217 |
| 6,502,194 | B1 | | 12/2002 | Berman et al. |

(Continued)

FOREIGN PATENT DOCUMENTS

WO    WO-02052540 A1    7/2002

OTHER PUBLICATIONS

"International Search Report in PCT/SG2004/000246", (Oct. 26, 2004), 4 pages.

(Continued)

*Primary Examiner* — Justin Shepard
(74) *Attorney, Agent, or Firm* — Creative Technology Ltd

(57) ABSTRACT

A method and system is provided to control playback of digital media on a playback device. The system may include a playback unit including at least one digital media storage communication interface to communicate with a media storage device, and a bi-directional remote control communication interface. Further, the system may include a separate remote control device to control the playback of the digital media on the playback device. The remote control device may include a complementary remote control communication interface for bi-directional communication with the remote control communication interface of the playback unit. The remote control device may also include a display screen, wherein the remote control device receives data from the playback unit for display on the display screen. The invention extends to a playback unit and to a remote control device.

34 Claims, 11 Drawing Sheets

U.S. PATENT DOCUMENTS

| | | | |
|---|---|---|---|
| 6,826,283 | B1 | 11/2004 | Wheeler et al. |
| 6,880,132 | B2 * | 4/2005 | Uemura .................. 715/848 |
| 7,069,508 | B1 | 6/2006 | Bever et al. |
| 7,089,321 | B2 * | 8/2006 | Hayashi .................. 709/237 |
| 7,251,413 | B2 * | 7/2007 | Dow et al. .................. 386/46 |
| 2001/0005201 | A1 | 6/2001 | Digiorgio et al. |
| 2002/0054028 | A1 | 5/2002 | Uchida et al. |
| 2002/0087996 | A1 * | 7/2002 | Bi et al. .................. 725/89 |
| 2002/0147985 | A1 * | 10/2002 | Miyajima et al. ............. 725/109 |
| 2002/0184625 | A1 * | 12/2002 | Allport .................. 725/39 |
| 2003/0140343 | A1 * | 7/2003 | Falvo et al. .................. 725/51 |
| 2003/0158899 | A1 * | 8/2003 | Hughes .................. 709/205 |
| 2004/0003398 | A1 * | 1/2004 | Donian et al. .................. 725/34 |
| 2004/0030599 | A1 * | 2/2004 | Sie et al. .................. 705/14 |
| 2004/0103434 | A1 * | 5/2004 | Ellis .................. 725/58 |
| 2004/0199654 | A1 | 10/2004 | Juszkiewicz |
| 2004/0224638 | A1 | 11/2004 | Fadell et al. |
| 2004/0249915 | A1 * | 12/2004 | Russell .................. 709/223 |
| 2005/0005300 | A1 * | 1/2005 | Putterman et al. .............. 725/89 |
| 2005/0071278 | A1 * | 3/2005 | Simelius .................. 705/52 |
| 2005/0262535 | A1 | 11/2005 | Uchida et al. |

OTHER PUBLICATIONS

"Niveus Control (Pocket PC Remote)", web.archive.org/web/20040302151631/store.niveusmedia.com/s.nl/c.304836/sc.2/category.2/it.l/id.5/.f, As archived Mar. 2, 2004, 2 pages.

"Philips iPronto: Dashboard for the Digital Home", web.archive.org/web/20030624030854/www.remotecontrol.philips.com/library/ipronto/Whilepaper_iPronto.pdf, As archived on Jun. 24, 2003, (2002), 13 pages.

"Selling Clicker v.2.0.1", web.archive.org/web/20030801113722/homepage.mac.com/jonassalling/Shareware/Clicker, As archived on Aug. 1, 2003, 2 pages.

"SLIMP3 Network MP3 Player", web.archive.org/web/20030716140634/slimdevices.com/downloads/SLIMP3.pdf, As archived on Jul. 16, 2003, 2 pages.

"TelCanto for SlimServer Features", http:www.telcanto.com/description_slimclient.htm, 2 pages.

"U.S. Appl. No. 10/654,122 Non Final Office Action mailed Jun. 15, 2006", 18 pgs.

"U.S. Appl. No. 10/654,122 Non Final Office Action mailed Jul. 3, 2007", 14 pgs.

"U.S. Appl. No. 10/654,122 Response filed Jun. 15, 2006 to Non Final Office Action mailed Jun. 15, 2006", 11 pgs.

"U.S. Appl. No. 10/654,122, Response filed Oct. 29, 2007 to Non-Final Office Action mailed Jul. 3, 2007", 55 pgs.

"U.S. Appl. No. 10/654,122, Final Office Action mailed Jan. 8, 2008", 13 pgs.

U.S. Appl. No. 10/654,122, Non-Final Office Action mailed Jun. 24, 2008, 21 pgs.

* cited by examiner

METHOD AND SYSTEM TO CONTROL PLAYBACK OF DIGITAL MEDIA

FIELD OF THE INVENTION

The present invention relates generally to the field of digital media and, more specifically, to a method and a system to control playback of digital media using a remote control device.

BACKGROUND OF THE INVENTION

More and more homes are now being equipped with local area networks. These so-called "home networks" provide digital connectivity using either wired and/or wireless links. Examples of wired links are Ethernet and HPNA Phone Line networks. Examples of wireless links are 802.11a, 802.11b, 802.11g and the like links that may provide digital wireless connectivity throughout the home.

Further, an increasing amount of digital media (e.g., digital media such as audio and video) is being stored on personal computers or PCs. For example, in many homes music and/or video content is stored on a central PC and products are now available that allow a user to reproduce or play back this content on a different playback device (e.g. a TV set or stereo). These products may use a home network to communicate the digital content to a playback client that, in turn, communicates the digital content to a playback device such as a TV set.

SUMMARY OF THE INVENTION

A method and system is provided to control playback of digital media on a playback device. The system may include a playback unit including at least one digital media storage communication interface to communicate with a media storage device, and a bidirectional remote control communication interface. Further, the system may include a separate remote control device to control the playback of the digital media on the playback device. The remote control device may include a complemental remote control communication interface for bidirectional communication with the remote control communication interface of the playback unit. The remote control device may also include a display screen, wherein the remote control device receives data from the playback unit for display on the display screen. In one embodiment, each playback unit may source media content data from a plurality of media content data from a plurality of media content storage devices and communicate the media content to one or more remote control devices.

The invention extends to a playback unit and to a remote control device. The invention also extends to a machine-readable medium including a set of instructions that, when execute by a machine, cause the machine to execute any of the methods described herein.

Other features of the present invention will be apparent from the accompanying drawings and from the detailed description that follows.

BRIEF DESCRIPTION OF THE DRAWINGS

The invention is now described, by way of example and not limitation, with reference to the accompanying diagrammatic drawings in which like reference numerals refer to the same or similar features unless otherwise indicated.

In the drawings.

DETAILED DESCRIPTION

Figure 1:
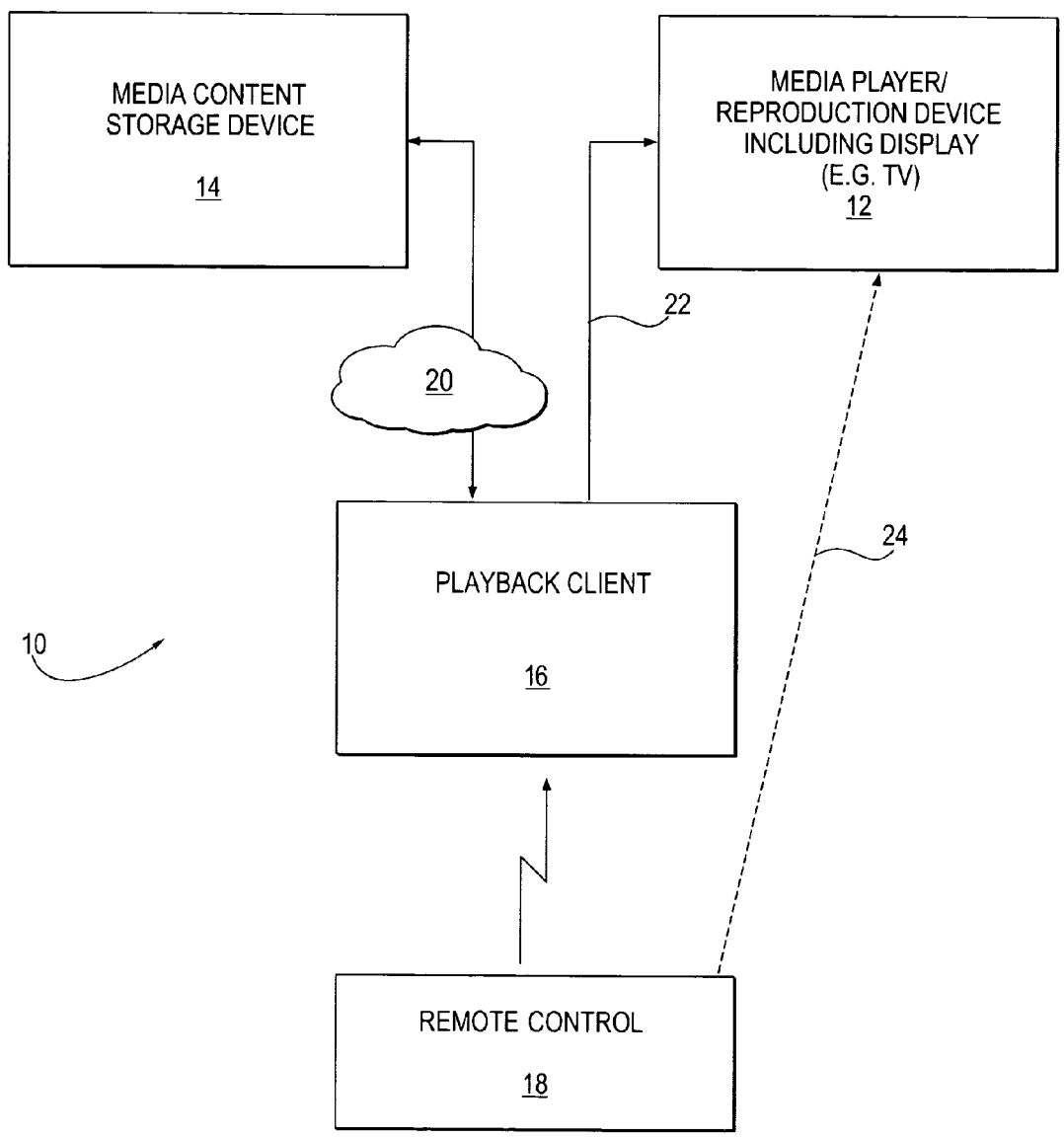
FIG. 1 shows a schematic block diagram of a prior art system to control playback of digital media on a playback device.

A method a system to control the playback of digital media is described. In the following description, for purposes of explanation, numerous specific details are set forth in order to provide a thorough understanding of the present invention. It will be evident, however, to one skilled in the art that the present invention may be practiced without these specific details.

Referring to the drawings, reference numeral 10 general indicates a system, in accordance with the prior art, to play back digital media on a playback or reproduction device 12. The system 12 includes a media content storage device 14, a playback client 16, and a remote control 18. The media content storage device 14 is typically in the form of a personal computer or PC on which audio files (e.g. music files) are stored. Audio data is typically communicated from the media content storage device 14 to the playback client 16 via a local area network 20 (e.g. a wired network connection, a wireless network connection (e.g., a wireless home network), or the like). The playback client 16 communicates selected audio files to the media player 12 via a hardwired connection 22. The media player 12 is typically a TV set or the like which has a display screen for displaying information to a user of the system 10. In use, the user may view the display screen of the TV set (see arrow 24) and, using the remote control 18, communicate with the playback client 16 to select audio for playback on the media player or playback device 12. In order to accomplish this, the playback client 16 receives the selected audio from the media content storage device 14 and communicates it to the media player or reproduction device 12. Accordingly, in the system 10 of the prior art, the user views some separate or independent display screen such as a TV set and uses the remote control 18 to select audio content for playback based on what is displayed on the TV set. Accordingly, in the prior art, unidirectional communication from the remote control 18 to the playback client 16 takes place and the remote control 18 does not include a display that receives media content information from the playback client 16.

Figure 2:
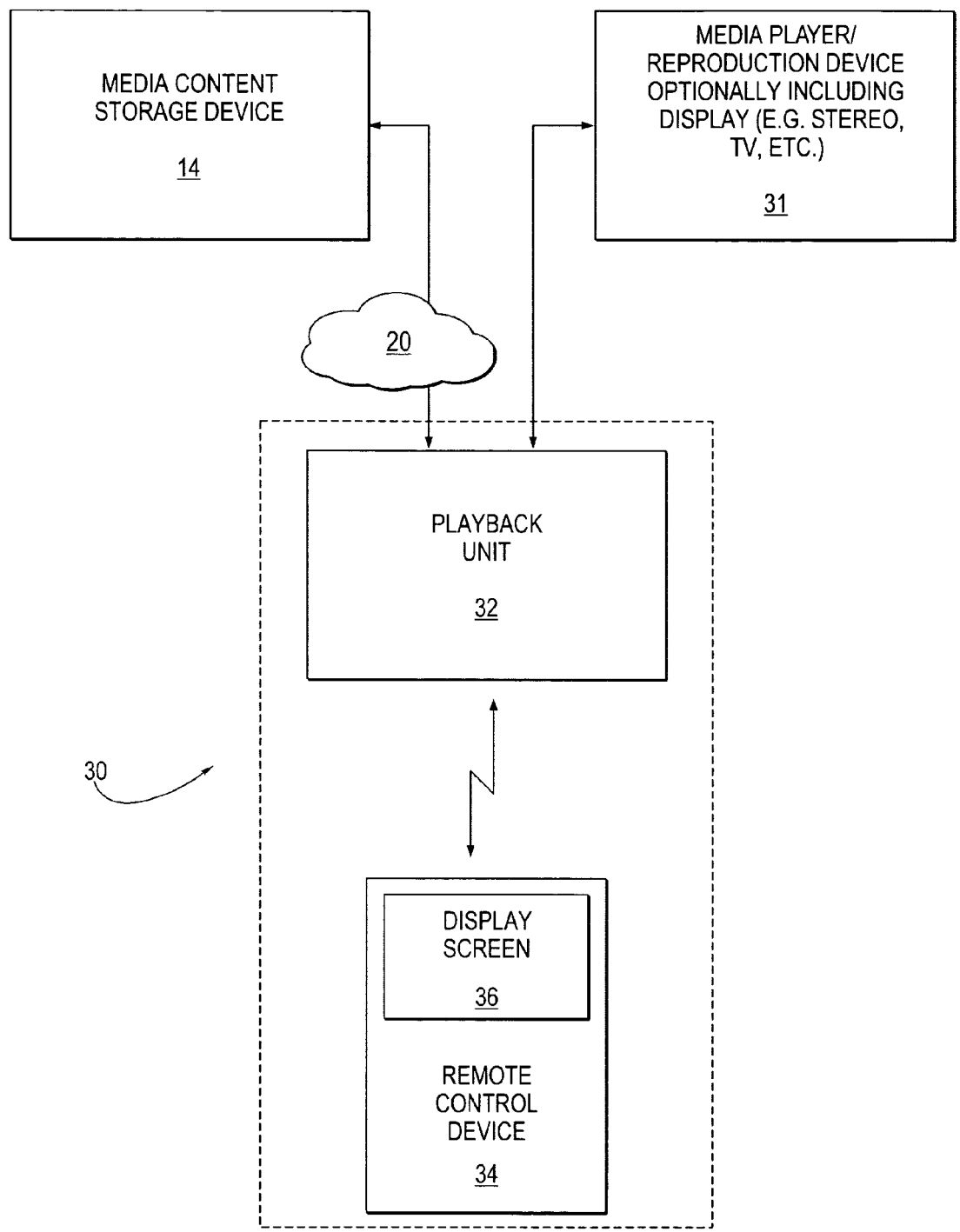
FIG. 2 shows a schematic block diagram of a system, in accordance with the invention, to control playback of digital media on a playback device.

Referring in particular to FIG. 2, reference numeral 30 generally indicates a system, in accordance with the invention, to control playback of digital media on a playback or reproduction device 31. The playback device 31 may be a television set, a stereo or any other playback device for playing back media content (digital and/or analog). It should be noted that the playback device 31 may or may not include a display screen.

Figure 6:
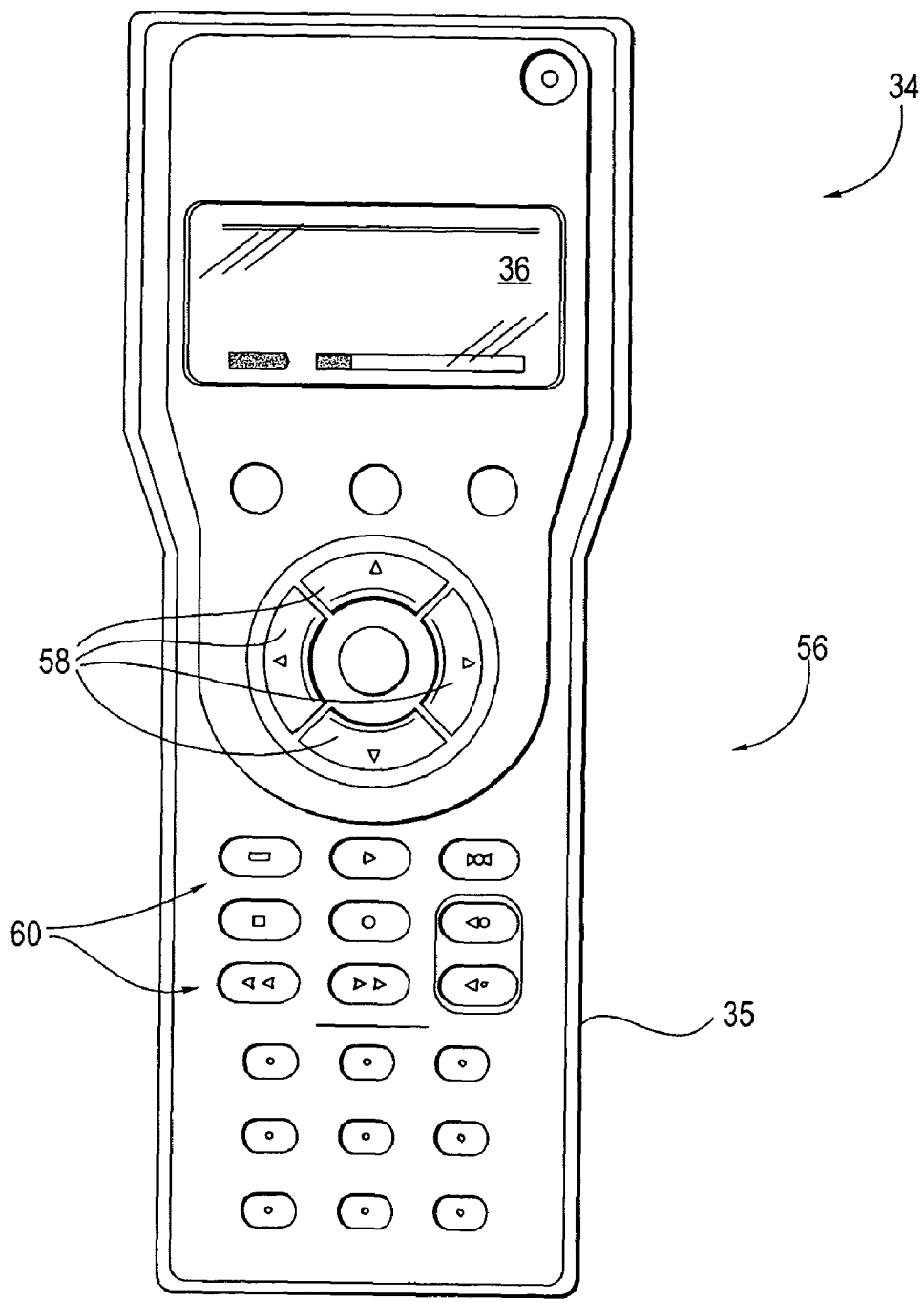
FIG. 6 a shows schematic view of an exemplary remote control device, in accordance with the invention.

The system 30 includes a playback unit 32, also in accordance with the invention, and a remote control device 34, also in accordance with the invention (see also FIG. 6). As described in more detail below, the system 30 displays content data on a display screen 36 of the remote control device 34. For example, the media content storage device 14 may store digital media in the form of music files, video files, photographs, or the like and the playback unit 32 may retrieve content data that identifies, or is associated with, the media files and communicate the content data to the remote control device 34 for display on the display screen 36. Further, as described in more detail below, the user may then select content (selected media) for reproduction or playback on the playback device 31 based on the information provided on the display screen 36. Thus, for example, the content data may include audio track titles, album names, video clip titles, photograph tiles, and so on that reside on the media content storage device 14. It will be appreciated that the media content storage device 14 may include any server (e.g., a personal computer) that may serve digital media content. In the system 30 of FIG. 2, the network 20 may be a wired network (e.g., using an IEEE 1394 connection or the like) or a wireless network (e.g., using 802.11 or any other wireless technology).

Figure 3:
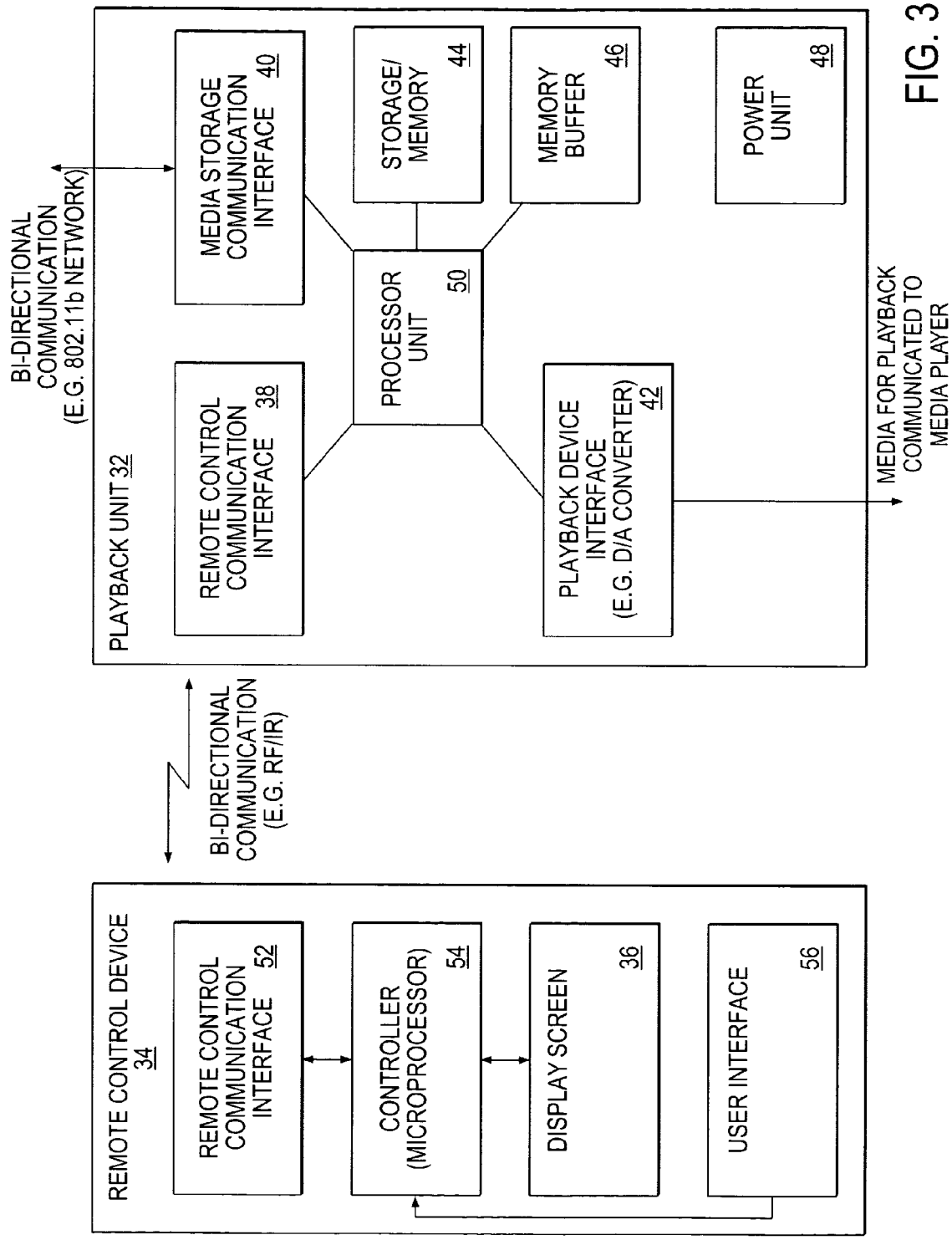
FIG. 3 shows a more detailed schematic block diagram of an exemplary remote control device and an exemplary playback unit of the system of FIG. 2.

Referring in particular to FIG. 3, the exemplary playback unit 32 includes a remote control communication interface 38, a media storage communication interface 40, and a playback device interface 42. Further, the playback unit 32 may include other components such as storage/memory 44, a memory buffer 46, a power unit 48, and a processor unit 50 to control operation of the playback unit 32.

The media storage communication interface 40 is typically a bi-directional communication interface such as a local area network (LAN) wireless device capable, for example, of communicating via a local area network using 802.11a, 802.11b, 802.11g or the like communication protocols. It is, however, to be appreciated that the playback unit 32 may communicate using any communication link or links (both wired and/or wireless) with any one or more digital content servers, as described in more detail below. In one embodiment, the media storage communication interface 40 is configured to communicate with a standard wireless network such as a standard wireless home network. In one embodiment, the playback device interface 42 connects the playback unit 32 to the playback device 31 via a hardwired connection.

Accordingly, the playback unit 32 may include RCA, SP/DIF audio outputs, or the like. In one embodiment, the playback device interface 42 includes a digital to analogue converter for converting digital media files (e.g., MP3, JPEG, WAV, AVI, or the like) received from the media content storage device 14 to a suitable form for playback on the playback device 31. The processor unit 50 is typically a microprocessor-based controller or the like to control operation of the playback unit 32. As described in more detail below, the remote control communication interface 38 is a bi-directional communication device to allow bi-directional communication between the remote control device 34 and the playback unit 32.

The remote control device 34 includes a complemental remote control communication interface 52 to communicate in a bi-directional fashion with the remote control communication interface 38 of the playback unit 32. Further, the remote control device 34 includes a controller 54 (e.g. a microprocessor-based controller), the display screen 36 (e.g., 132×64-pixel LCD graphic display providing 5 lines of text display), and a user interface 56 (see also FIG. 6). The user interface 56 includes navigation buttons 58 as well as other functional buttons 60 to allow a user to select and play digital media stored on the media content storage device 14. The user interface 56 and the display screen 36 allow a user to browse (e.g., by artist, album, genre, all tracks, playlist or the like) and select media content stored on the media content storage device 14. In one embodiment, the remote control device 34 includes a hand-held housing 35 which is shaped and dimensioned to render the remote control device 34 portable.

The remote control communication interfaces 38 and 52 may be radio frequency interfaces, optical interfaces (e.g. infrared), or any other communication interface. For example, the communication interfaces 38, 52 may be low power devices having a range suitable for use within a domestic dwelling. The display screen 36 may be an LCD display or the like suitable for displaying data in the form of text to a user so that the user may select content for playback on the playback device 31. As described in more detail below, the display screen 36 may operate in conjunction with the user interface 56 in a menu driven fashion so that media content available on the media content storage device 14 may be displayed to the user on the display screen 36 and, in response thereto, the user may then select one or more media files for playback on the playback device 31. Thus, unlike the prior art where the playback device 31 itself provides a display screen to display the media content available on the media content storage device 14 to the user, the remote control device 34, in accordance with the present invention, includes the display screen 36 for displaying media content to the user for selection.

Figure 4:
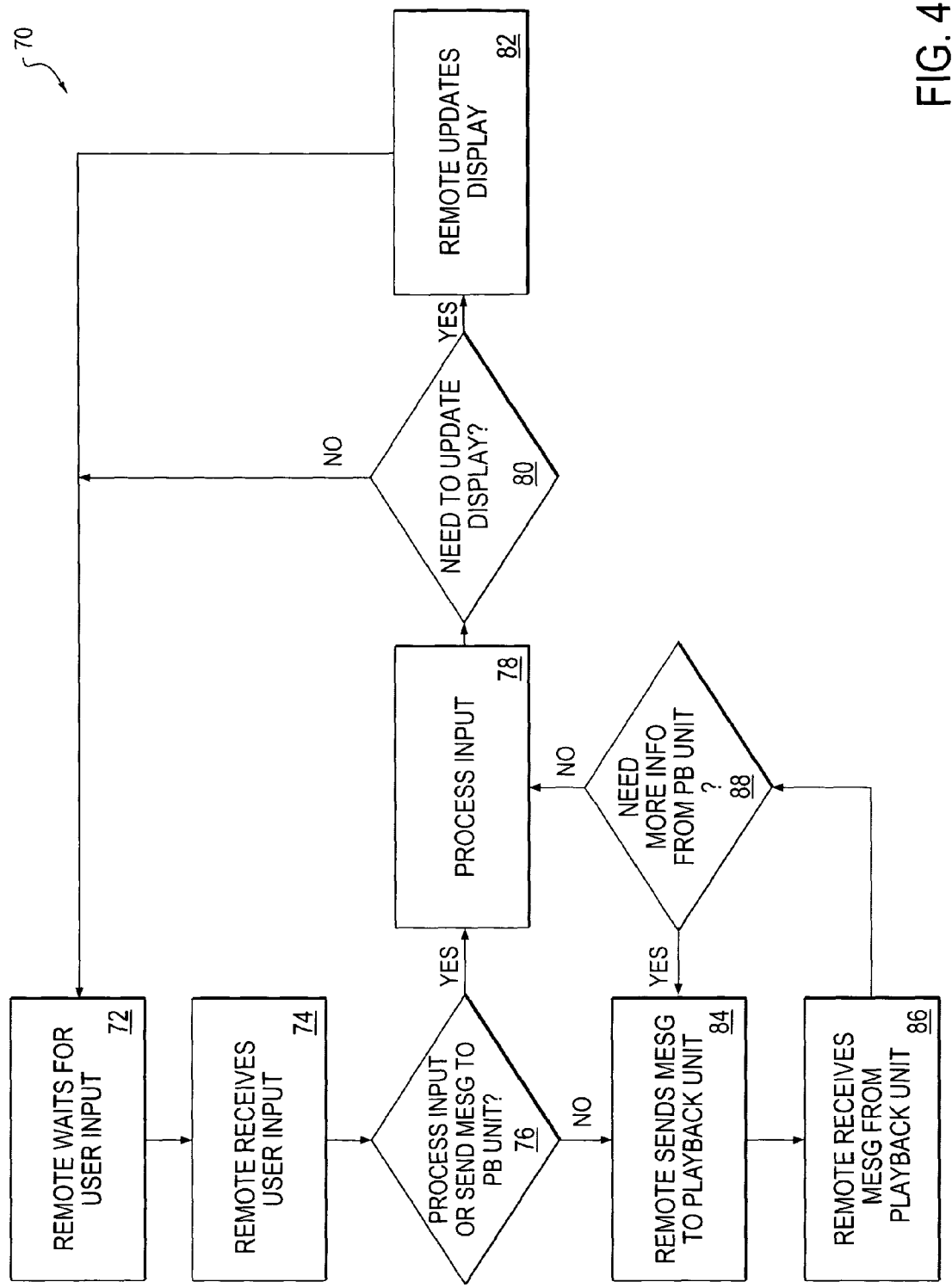
FIG. 4 shows a schematic flow diagram of a method, in accordance with the invention, to control playback of digital media using a remote control device.

Referring in particular to FIG. 4, reference numeral 70 generally indicates a method, in accordance with the invention, to display and control playback of digital media using a remote control device. The method 70 may be carried out on the exemplary remote control device 34. As shown at operation 72, the remote control device 34 waits for user input via the user interface 56. When user activity or input is detected (see operation 74), the method 70 then identifies if the input from the user requires processing or if a message (e.g., requesting media content data) must be sent to the playback unit 32 (see decision operation 76). If the input received from the user requires processing, then the method 70 processes the input or request (see operation 78) and, as shown at decision operation 80, decides whether or not the display screen 36 is to be updated (e.g., scroll through text available on the remote control device 34). If the display screen 36 does not require updating, then the method 70 returns to operation 72. If, however, the display screen 36 requires updating, then the method 70 updates the display screen 36 as shown at operation 82 and, thereafter, returns to operation 72 where it waits for further user input.

Returning to decision operation 76, when the user input requires communication with the playback unit 32, the method 70 proceeds to operation 84 and sends a request or message to the playback unit 32 and awaits a return message as shown at operation 86. For example, when the remote control device 34 requests information from the media content storage device 14 (e.g. information on the content available for playback on the playback device 31), the playback unit 32 may then communicate a media data request to the media content storage device 14 via the local area network 20 (see FIG. 2). In response to the media data request, the media content storage device 14 may then communicate content data to the playback unit 32 which, in turn, communicates the data to the remote control device 34 (see operation 86) for display on the display screen 36. As shown at decision operation 88, the method 70 may identify whether or not further information or data is required from the playback unit 32 (and/or media content storage device 14) and, if so, the method 70 returns to operation 84. If, however, no further information or data is required from the playback unit 32, then the method 70 proceeds to operation 78 where the data is processed.

Figure 5:
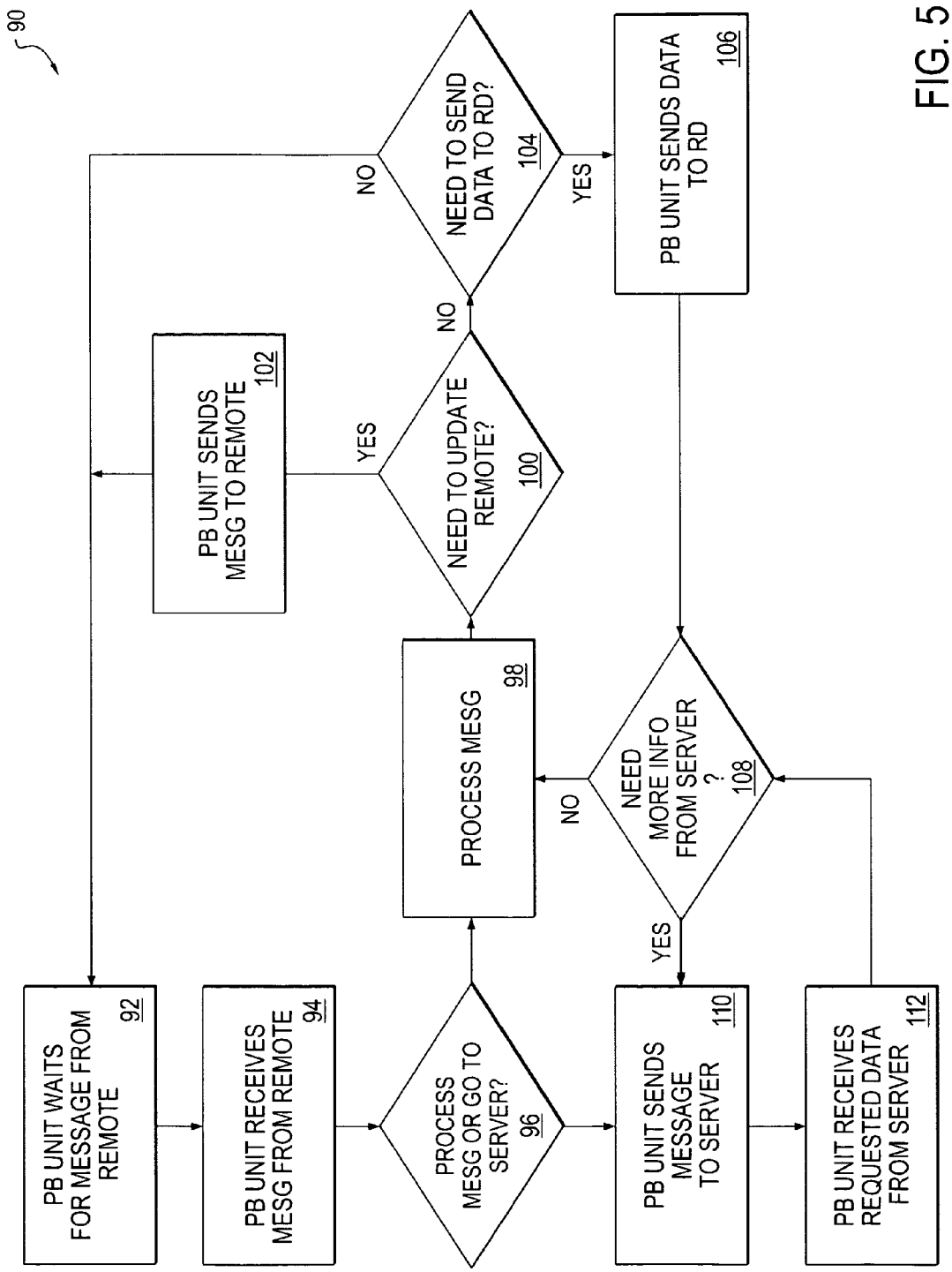
FIG. 5 shows a schematic flow diagram of a method, in accordance with the invention, to control playback of digital media using a playback unit.

Referring in particular to FIG. 5, reference numeral 90 generally indicates a method, in accordance to the invention, to control playback of media data using a playback unit. The method 90 may be carried out on the playback unit 32. As shown at operation 92, the playback unit 32 may await a message or data request from the remote control device 34. When a message or data request is received from the remote control device 34 (see operation 94), then a decision is made at decision operation 96 as to whether or not the playback unit 32 can process the request or whether the request should be communicated to the media content storage device 14. The media content storage device 14 may act as a server that provides the digital media to any one or more playback units 32.

Returning to operation 96, if the playback unit 32 can process the message or data request received from the remote control unit 34, then, as shown at operation 98, the playback unit 32 processes the message. As shown at decision operation 100, a determination is then made as to whether or not the remote control device 34 (e.g., its display screen 36) requires updating. If the remote control device 34 requires updating, then as shown at operation 102, appropriate data is communicated by way of, for example, a message to the remote control device 34 and, thereafter, the method 90 returns to operation 92 where it waits for further user input. If, however, no updating of the remote control device 34 is required, then, as shown at decision operation 104, a determination is made as to whether or not data is to be communicated from the playback unit 32 to the reproduction or playback device 31. For example, if the user has selected a particular media file (e.g. a music file such as an MP3 file) to be played back on the playback device 31, then the playback unit 32 may stream the music file (see operation 106) to the playback device 31.

As shown at decision operation 108, the method 90 then determines whether or not further digital media (e.g., further streaming) is required from the media content storage device 14 and, if so, the playback unit 32 may then send a message/request to the media content storage device 14 requesting further media content (see operation 110). An application running on the media content storage device 14 may then communicate the requested data to the playback unit 32 which then, accordingly, receives the requested media content data (see operation 112). Thereafter, as shown at decision operation 108, a determination is made whether or not further information or data is required from the media content storage device 14. If, however, no more information or data is required from the media content storage device 14, then the method 90 reverts to operation 98 where the message or data is processed. It will be appreciated that any data (e.g., media files) communicated via the system 30 may be compressed and decompressed, encoded, or the like.

Returning to decision operation 96, if the playback unit 32 does not need to process any data (and thus does not need to proceed to operation 98) but requires media content data from the media content storage device 14, then the method 90 proceeds directly to operation 110 where the playback unit 32 sends a request or message to the media content storage device 14.

In one embodiment, the media content storage device 14 is a PC including server software that manages media content stored on the PC and communicates with the playback unit 32 via the network 20. The PC may communicate with any number of playback units 32. In one embodiment,, as described in more detail below, a single remote control device 34 can communicate with more than one playback unit 32, one at a time. In one embodiment, the remote control device 34 is an RF remote control with an operating range suitable for use in a domestic dwelling (e.g. a range of 10 about meters).

In one embodiment, operation of the remote control device may be divided into 3 main functional areas, namely, administrative, transport and navigation. Exemplary administrative functions include powering the remote control device 34 up and down, providing information on media presently being played via the reproduction or playback device 31, or the like. Exemplary transport functions include Play/Pause, Scan forward/skip, Scan backward/back, Stop, Mute, Volume up and down, Mode, or the like. Exemplary navigation functions include Menu, Music, Library, Left, Right, Down, Up, Favorites, playlists (e.g., using buttons 1-9), OK (to save settings/select items), or the like.

Figure 7:
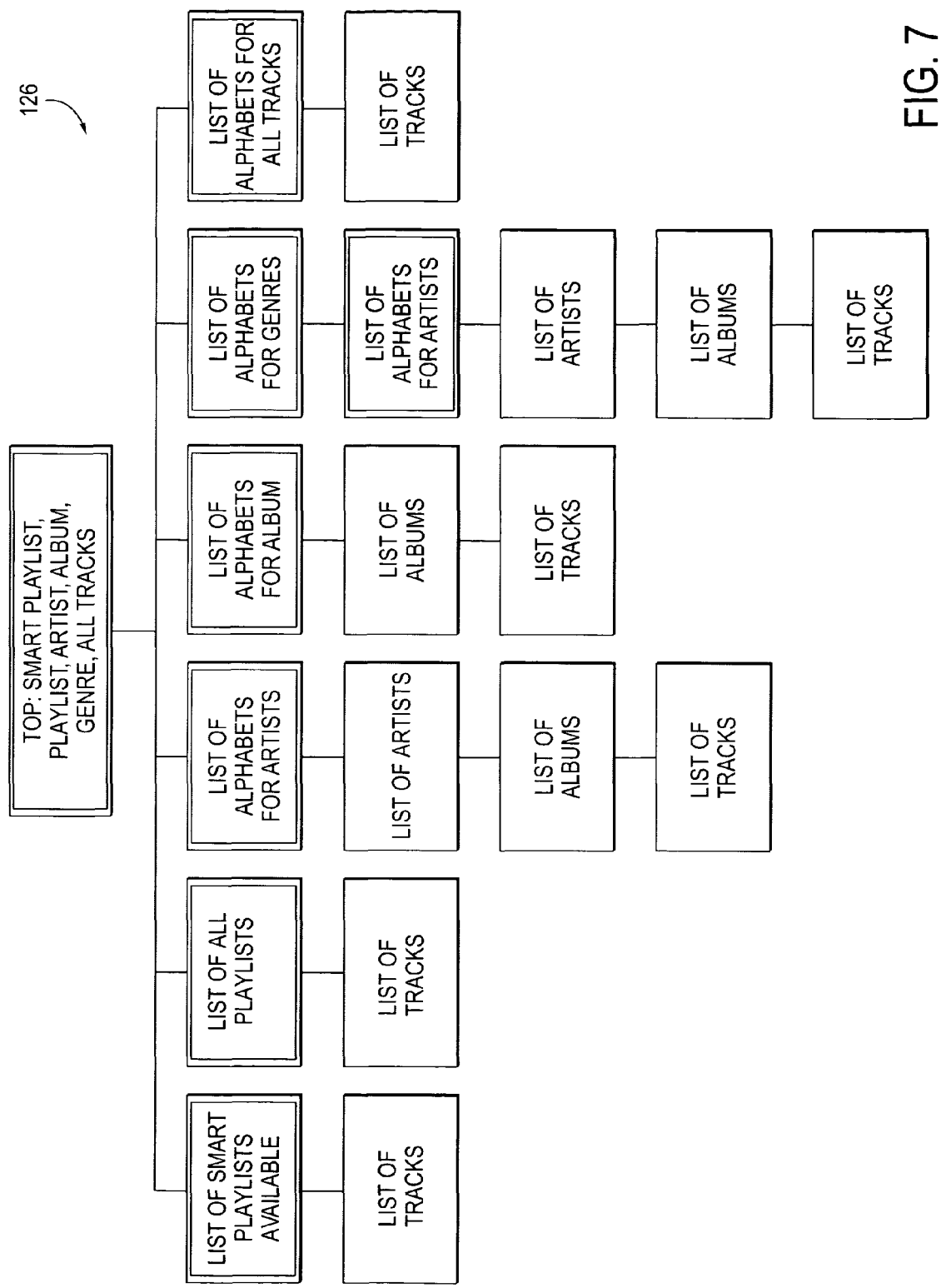
FIG. 7 shows an exemplary media content hierarchy of media content data for display on a display screen of the remote control device.
Figure 8:
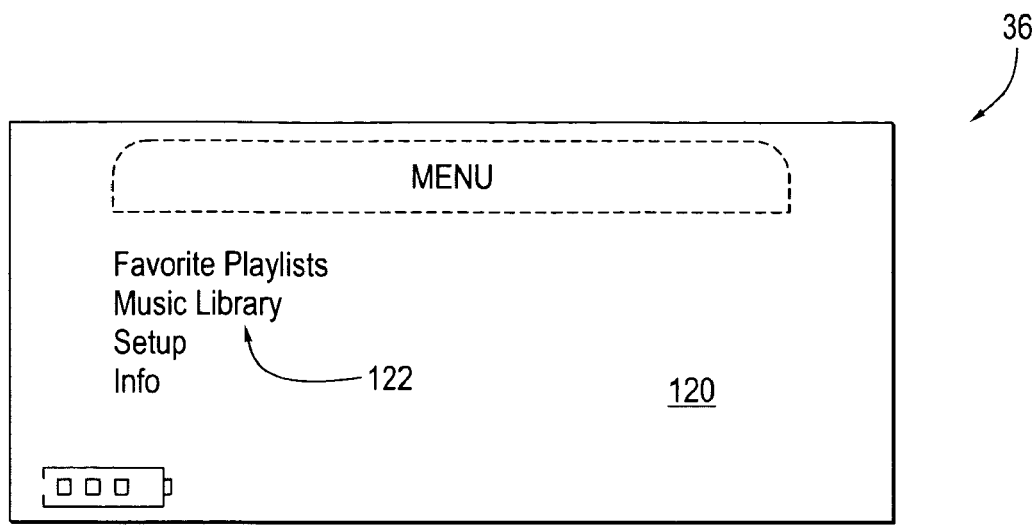
FIG. 8 shows a schematic view of an exemplary user interface presented to the user on the display screen of the remote control device.
Figure 9:
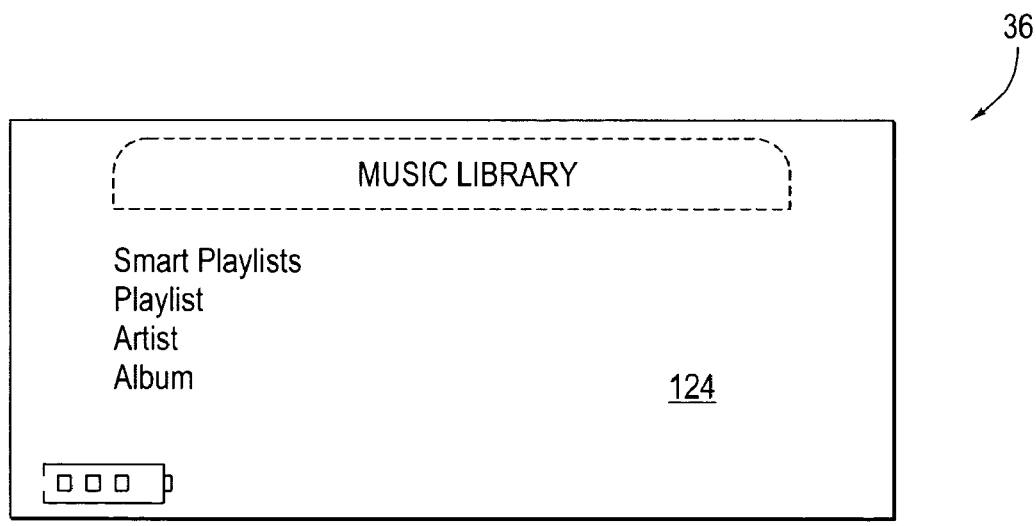
FIG. 9 shows a schematic view of an exemplary user interface to present media content to the user on the display screen.

Reference numeral 120 (see FIG. 8) generally indicates an exemplary graphic user interface presented to the user on the display screen 36 to select digital media stored on, and served from, the digital media storage device 14. In the exemplary embodiment shown in FIG. 8, a user may select group descriptions such as "Favorite Playlists", "Music Library", "Setup", and "Info". It will however be appreciated that the information displayed by the graphic user interface 120 may be dependent upon the digital media available from the digital media storage device 14. As mentioned above, navigation of digital content displayed on the display screen 36 may be accomplished in a drill-down fashion in conjunction with the navigation buttons 58 (see FIG. 6). For example, if the user selects the "Music Library" option 122, then a further graphic user interface 124 may be presented to the user on the display screen 36. In this menu-driven fashion, media content (e.g., music files, video files, pictures, or any other digital media) arranged in a hierarchy 126 (see FIG. 7) may be browsed or navigated. In one embodiment, navigation functionality using the display screen 36 and the user interface 56 may resemble the navigation functionality provided on a Creative NOMAD Jukebox available from Creative Technology Ltd.

Figure 10:
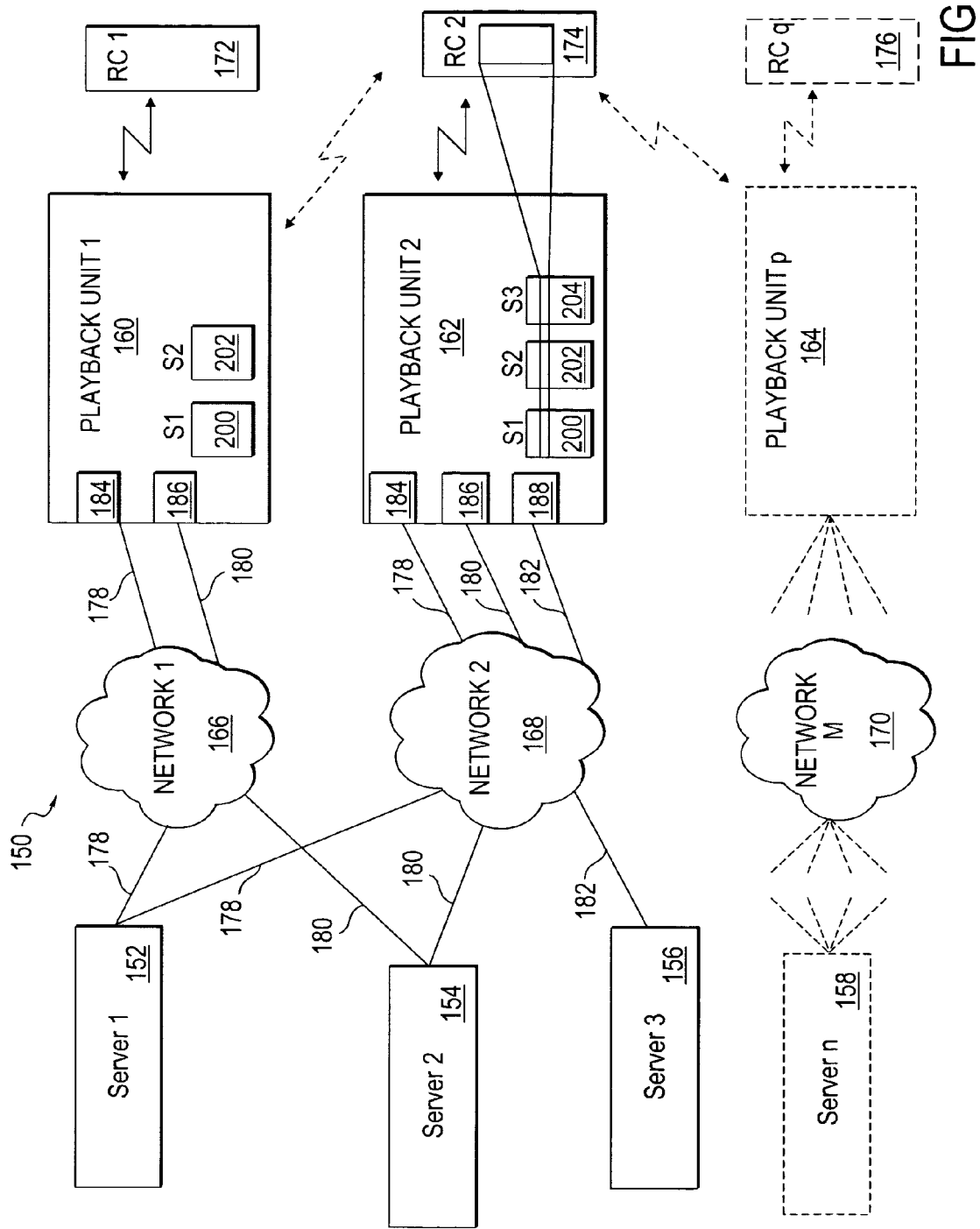
FIG. 10 shows a schematic diagram of a further system, also in accordance with the invention, to control the playback of digital media residing on a plurality of media content storage devices in the exemplary form of digital media servers.

Referring in particular to FIG. 10, reference numeral 150 generally indicates an exemplary system, in accordance with the invention, for controlling the playback of media data sourced from a plurality of media content storage devices. In the system 150, the media content storage devices are shown to be in the form of a plurality of servers 152, 154, 156, and 158. The servers 152 to 158 are connectable to one or more playback units 160, 162, and 164 via one or more networks 166, 168, and 170. Further, each playback unit 160, 162, 164 may communicate with one or more remote control devices 172, 174, and 176. The servers 152 to 158, the networks 166 to 170, the playback units 160 to 164, and the remote control devices 172 to 176 may resemble or be substantially similar to the media content storage device 14, the network 20, the playback unit 32, and the remote control device 34, respectively, as described above.

It is to be appreciated that the networks 166 to 170 need not be identical networks but may differ in nature. For example, the network 166 may be a wireless network whereas the network 168 may be a wired network. Accordingly, the playback unit 160 and the playback unit 162 may each include different media storage communication interfaces to communicate in both a wired and wireless fashion (see, for example, the media storage communication interface 40 of the playback unit 32 shown in FIG. 3). Thus, it will be appreciated, that any combination of wired or wireless networks may form part of the system 150.

Further, a plurality of different communication protocols may be used to communicate with the servers 152 to 158 of the system 150. For example, servers 152, 154, and 156 may each use a different communication protocol when communicating via the networks 166 and 168. Thus, the server 152 may communicate using communication protocol 178 and, accordingly, playback units 160 and 162 may thus include a first driver protocol interface 184 (see also FIG. 12) suitable for interfacing the playback units 160 and 162 via the networks 166 and 168 using the communication protocol 178. Likewise, the server 154 may communicate using a communication protocol 180 and, accordingly, the playback units 160 and 162 may include a second driver protocol interface 186. In a similar fashion, the playback unit 162 may include a third driver protocol interface 188 to communicate with the network 168 using the communication protocol 182. It will be appreciated that each playback unit 160 to 164 may thus include a plurality of different driver protocol interfaces for accommodating communication with the servers 152 to 158 that may use any one of a plurality of driver protocols (e.g., any standard communication protocol such as TCP/IP, or the like).

Figure 12:
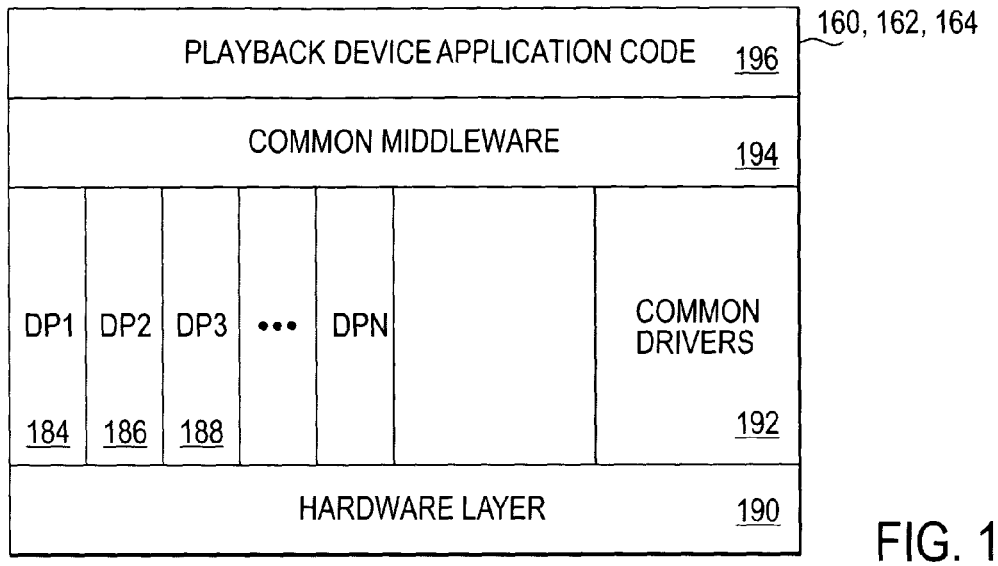
FIG. 12 shows an exemplary configuration of a playback unit used in the system of FIG. 10 showing a plurality of driver protocols.

As shown in FIG. 12, each exemplary playback unit 160 to 164 may include a hardware layer 190 (see, for example, FIG. 3), common drivers 192, for example, to interface the playback units 160 to 164 to playback devices (for example the playback or reproduction device 31 as described above), a common middleware layer 194, and playback device application code 196 that may, for example, execute the method 90 (see FIG. 5).

In one embodiment of the invention, in order to accommodate multiple the servers 152 to 158, each playback unit 160 to 164 may include a stack for storing media content data available from an associated server. For example, the playback unit 160 may include a media content stack 200 associated with the server 152, and a media content stack 202 associated with the server 154. Likewise, the playback unit 162 may include a media content stack 200 associated with the server 152 and a media content stack 202 associated with the server 154. However, in addition to the media content stacks 200 and 202, the playback unit 162 may include one or more further media content stacks, for example, a media content stack 204 associated with the server 156. It will be appreciated that any number of media content stacks may be provided corresponding to additional servers with which a playback unit 160 to 164 is communicating.

Figure 11:
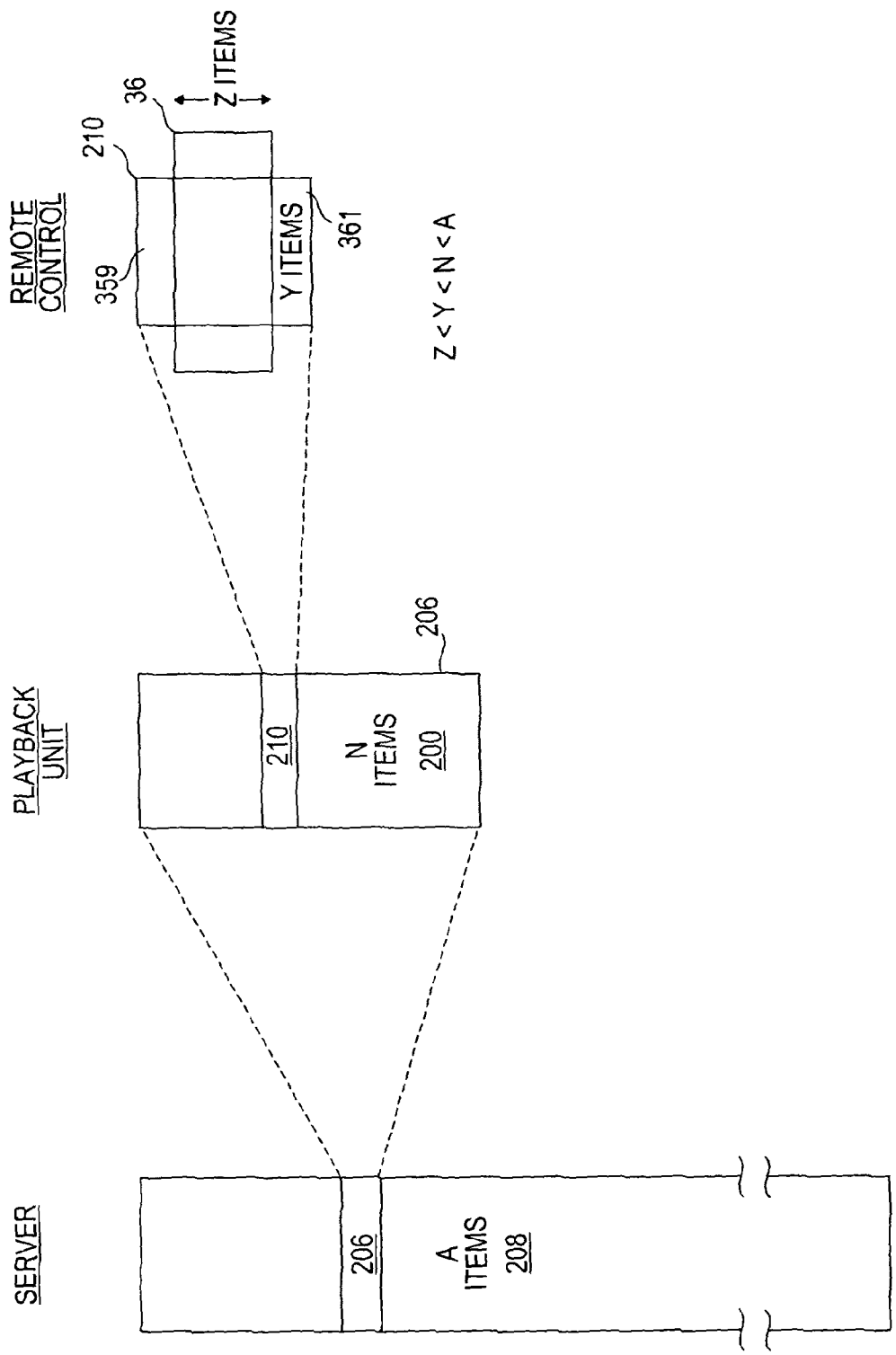
FIG. 11 shows a schematic diagram of sub-sets of media content data stored on a media content storage device, a playback unit, and a remote control device.

As shown in FIG. 11, with specific reference to the exemplary media content stack 200, in one embodiment the media content stack 200 includes a subset (e.g., N items) of media content data 206 that is available from a total amount of media content data 208 on the server 152 (e.g., A items or listings of audio and/or video items or files available for playback). Likewise, media content data provided on any one of the remote control devices 172 to 176 may be a subset 210 (e.g. Y items) of the media content retrieved by the playback units 172 to 176. It will be appreciated that the media content data provided on the playback units 160 to 164 and the remote control units 172 to 176 can dynamically change as a user requests different media content from the servers 152 to 158. Further, the media content retrieved by each playback unit 160 to 164 may differ based on user selection and, likewise, the media content provided on each remote control device 171 to 176 may differ based on user selection.

In one embodiment of the invention, the remote control devices 172 to 176 are substantially similar to the remote control device 30 (see FIG. 2). Each remote control device 172 to 176 may thus include a display screen 36 on which media content data (e.g., Z items) is displayed to the user. However, it will be appreciated that the display screen 36 may be limited in the amount of media content data that it can display to the user (Z<Y<N<A). Accordingly, in one embodiment, each remote control device 172 to 176 stores media content data received from a playback unit 160 to 164 in the media content data stack and only a portion (Z items) of the media content data that is available on the remote control unit 172 to 176 or displayed on the display screen 36. As described in more detail below, a user may then use the exemplary user interface 56 (see FIG. 6) to scroll through media content data (e.g., text) provided in a media content stack (see, for example, the content hierarchy 126 of FIG. 7).

Figure 13:
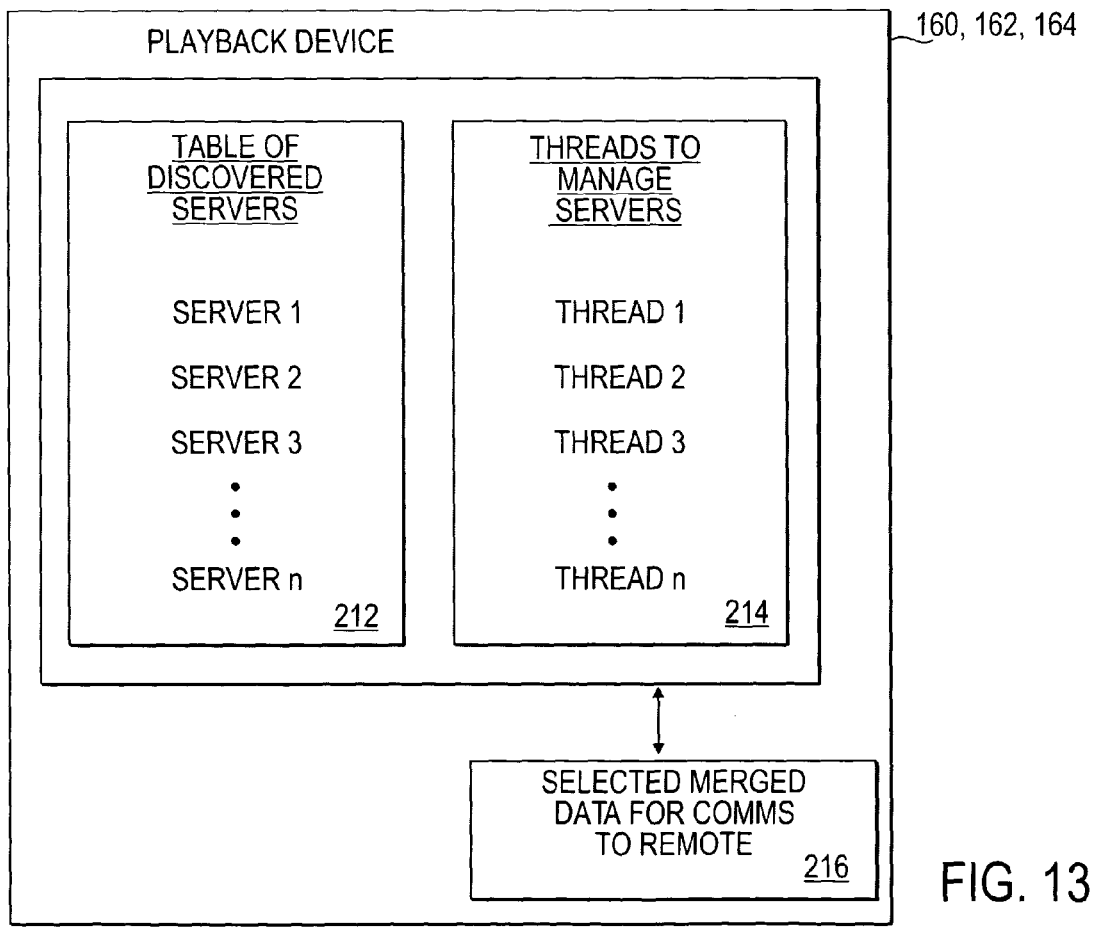
FIG. 13 shows an exemplary table of discovered media storage devices and threads to manage the discovered media storage devices.

In one embodiment of the invention, each playback unit 160 to 164 includes a table of discovered devices or servers 212 (see FIG. 13) wherein data or information on all media content storage devices, such as the servers 152 to 158, is provided. Further, each playback unit 160 to 164 may include threads 214 to manage the servers 152 to 156. In particular, the exemplary playback unit 160 may use the table 212 and the threads 214 to source or retrieve media content data from the servers 152 and 154 and merge the data prior to communication thereof to the remote control device 172 (or any other remote control devices, such as the remote control device 174, with which it may be communicating). Likewise, the playback unit 162 may source media content data from the servers 152 to 156 and merge or combine the media content data received for communication to any one or more remote control devices 174 to 176. In one embodiment, the playback units 160 to 164 may thus include a merge module 216 (see FIG. 13) for merging media content data for communication to one or more remote control devices 172 to 176. The remote control devices 172 to 176 may thus be totally ignorant of the source (e.g., which media content provider) of the media content received from an associated playback unit 160 to 164. The threads 214 may also control playback of selected media (e.g. a selected audio file) on the playback device 31.

Thus, method and system to control the playback of digital media have been described. Although the present invention has been described with reference to specific exemplary embodiments, it will be evident that various modifications and changes may be made to these embodiments without departing from the broader spirit and scope of the invention.

Accordingly, the specification and drawings are to be regarded in an illustrative rather than a restrictive sense.

What is claimed is:

1. A system to control playback of digital media on a separate playback device via a wireless local area network, the system including:
- a playback unit connectable between the separate playback device and the wireless local area network to render the digital media to a user, the playback unit including:
  - a wireless network interface to communicate via the wireless local area network with a plurality of separate computers and to request and receive the digital media for playback from any of the separate computers, each separate computer including at least one media storage device
  - a playback device interface to connect the playback unit to the separate playback device, the connection between the playback unit and the playback device being independent of the wireless local area network;
  - a bi-directional remote control communication interface in addition to the wireless network interface; and
  - a first processor configured to:
    - combine separate content data received from each of the plurality of separate computers to provide the combined content data to a separate remote control device, the combined content data identifying the digital media available on an associated separate computer for playback via the playback unit; and
    - determine whether a display screen of the remote control device needs to be updated based on the combined content data; and
- the separate remote control device to control the playback of the digital media on the separate playback device via the playback unit, the remote control device including:
  - a complemental remote control communication interface for bi-directional communication with the remote control communication interface of the playback unit;
  - the display screen, wherein the remote control device receives combined content data from the playback unit for display on the display screen; and
  - a second processor for determining whether the display screen needs to be updated based on the received combined content data.

2. The system of claim 1, wherein at least one of the separate computers is a personal computer that includes server software that manages media content on the personal computer.

3. The system of claim 1, wherein the playback unit requests the separate content data from the plurality of separate computers and communicates the content data to the remote control device for display on the display screen to allow a user to select digital media independently of any display provided on the playback device.

4. The system of claim 3, wherein the remote control device includes a user interface that allows a user to select digital media for playback on the playback device, the selected digital media being selected by the user from the combined content data and the playback unit being configured to communicate with the separate computer associated with the selected digital media the user interface operating in conjunction with the display screen to select the digital media.

5. The system of claim 4, wherein the user interface and the display screen operate in a menu-driven fashion, the combined content data being included in the menu and being sourced via the playback unit from any one or more of the separate computers.

6. The system of claim 1, wherein the playback unit combines the separate content data from the plurality of separate computers and communicates selected combined content data to the remote control device.

7. The system of claim 1, wherein the playback unit includes a plurality of different wireless network interfaces each of which communicates with a separate computer via a wireless network, and wherein each wireless network interface allows communication using a different communication protocol.

8. The system of claim 1, wherein the digital media includes at least one of audio files, video files and picture files and the separate content data identifies the files.

9. The system of claim 1, wherein the playback unit includes a first display data cache and the remote control device includes a second display data cache, the first display data cache including a subset of media content available from the plurality of separate computers and the second display data cache including a subset of data of the first display data cache.

10. The system of claim 1, wherein multiple threads are used to communicate the digital media via the wireless network to a plurality of playback units.

11. The system of claim 1, further comprising:
- a separate second remote control device to control the playback of the digital media on the separate playback device via the playback unit, the second remote control device including:
  - a second complemental remote control communication interface for bi-directional communication with the remote control communication interface of the playback unit; and
  - a second display screen, wherein the second remote control device receives combined content data from the playback unit for display on the second display screen, wherein the playback unit combines separate content data received from each of the plurality of separate computers to provide the combined content data to the second remote control device, the separate content data identifying the digital media available on an associated separate computer for playback via the playback unit.

12. A playback unit for controlling playback of digital media under control of a separate remote control device, the playback unit including:
- a wireless network interface to communicate via a wireless local area network with a plurality of local computers and to request and receive the digital media for playback, each local computer including at least one media storage device
- a playback device interface to connect the playback unit to a separate playback device to render the digital media to a user, the connection between the playback unit and the playback device being independent of the wireless local area network; and
- a bi-directional remote control communication interface in addition to the wireless network interface, the bi-directional remote control communication interface being operable to communicate combined content data for display on a display screen of, and receive a media data request from, the remote control device; and
- a processor configured to determine whether the display screen of the remote control device needs to be updated based on the combined content data, wherein the playback unit receives and combines separate content data communicated to the remote control device from each of the plurality of local computers via the wireless local area network, the combined content data identifying the digital media on the plurality of local computers for playback via the playback unit.

13. The playback unit of claim 12, wherein the wireless network interface communicates with the plurality of local computers via multiple threads, each thread being associated with a different local computer providing digital media for playback on a playback unit.

14. The playback unit of claim 12, wherein the remote control communication interface is one of a bi-directional optical interface and a radio frequency interface and wherein the display screen of the remote controls allows a user to select digital media independently of any display provided on the playback device connected to the playback unit.

15. The playback unit of claim 12, which includes a plurality of different wireless network interfaces, each of which is for communication with different local computer via the wireless local area network, and wherein each wireless network interface allows communication using a different communication protocol.

16. The playback unit of claim 15, which includes a discovered storage device table to identify media content storage devices that it discovers, and a corresponding processing thread for each storage device discovered, and wherein display data retrieved by each thread is combined prior to communicating it to the remote control device.

17. The playback unit of claim 12, wherein the playback unit includes a first display data cache from which display data is communicated to a second display data cache of the remote control device, the first display data cache including a subset of media content available from the and the second display data cache including a subset of the first display data cache.

18. A method to control playback of digital media on a separate playback device, the method including:
receiving separate content data at a playback unit via a wireless local area network from a plurality of local computers, the separate content data identifying digital media stored on a media storage device of an associated local computer
at the playback unit, combining the separate content data received from the plurality of local computers to provide combined content data;
at the playback unit, determining whether a display screen of a separate remote control device needs to be updated based on the combined content data;
communicating the combined content data via a bi-directional communication interface to the remote control device for display on the display screen of the remote control device;
monitoring user selection of selected digital media identified by the combined content data;
at the playback unit, determining whether the display screen of the remote control device needs to be updated based on the monitored user selection;
communicating the selected digital media received via the wireless local area network from any of the plurality of local computers to the playback unit; and
communicating the digital media from the playback unit to the playback device independently of the wireless local area network to cause the selected digital media to be played on the playback device.

19. The method of claim 18, which includes monitoring user selection of the selected digital media utilizing a user interface operating in conjunction with the display screen, the digital media being associated with one of a plurality of threads used to communicate digital content from the plurality of local computers via the wireless local area network.

20. The method of claim 19, wherein the user interface and the display screen operate in a menu-driven fashion, the combined content data being included in the menu and being sourced via the playback unit from any of the local computers and the display screen allows a user to select digital media independently of any display provided on the playback device.

21. The method of claim 18, which includes communicating with different local computers using different communication protocols.

22. The method of claim 18, which includes storing content data in a first display data cache of the playback unit and communicating a subset of the data in the first display data cache to a second display data cache of the remote control device, the first display data cache identifying a subset of media content available from the plurality of local computers.

23. A method of controlling playback of digital media via a separate playback unit under control of a separate remote control device, the method including:
receiving a content data request from the remote control device at the playback unit;
communicating the content data request from the playback unit via a wireless local area network to a plurality of local computers each including at least one media storage device;
receiving separate content data from each of the plurality of the local computers via the wireless local area network, the separate content data identifying media content available at an associated local computer for playback on the playback device;
at the playback unit, combining content data received from the plurality of local computers to provide combined content data;
communicating the combined content data to the remote control device for display on a display screen of the remote control device;
receiving a user selection for playback from the remote control device that identifies selected media content and causing the selected media content to be played on the separate playback device via a connection between the playback device and the playback unit that is independent of the wireless local area network; and
at the playback unit, determining whether the display screen of the remote control device needs to be updated based on the user selection or the combined content data.

24. The method of claim 23, wherein multiple threads are used to communicate the digital media via the wireless network to a plurality of playback devices.

25. The method of claim 23, which includes communicating with the remote control device via one of a bi-directional optical interface and a radio frequency interface, a display screen of the remote control device allowing a user to select digital media independently of any display provided on the playback device.

26. The method of claim 23, which includes communicating with different media storage devices using different communication protocols.

27. The method of claim 23, which includes storing separate content data in a first display data cache of the playback unit and communicating a subset of the data in the first display data cache to a second display data cache of the remote control device, the first display data cache identifying a subset of media content available from the plurality of local computers.

28. A non-transitory machine-readable medium storing instructions that, when executed by a machine, cause the machine to:

receive separate content data at a playback unit via a wireless local area network from a plurality of local computers, the separate content data relating to digital media stored on a media storage device of an associated local computer at the playback unit, combine the separate content data received from the plurality of local computers to provide combined content data;

at the playback unit, determine whether a display screen of a separate remote control device needs to be updated based on the combined content data;

communicate the combined content data via a bi-directional communication interface to the remote control device for display on the display screen of the remote control device;

monitor user selection of selected digital media identified by the combined content data;

at the playback unit, determine whether the display screen of the remote control device needs to be updated based on the monitored user selection;

communicate the selected digital media received via the wireless local area network from any of the plurality of local computers to the playback unit; and communicate the digital media from the playback unit to the playback device independently of the wireless local area network to cause the selected digital media to be played on the playback device.

29. A non-transitory machine-readable medium storing instructions that, when executed by a machine, cause the machine to:

receive a content data request from a remote control device at a playback unit;

communicate the content data request from the playback unit via a wireless local area network to a plurality of local computers each including at least one media storage device;

receive separate content data from each of the local computers via the wireless local area network, the separate content data identifying media content available at an associated local computer for playback on the playback device via a connection between the playback device and the playback unit that is independent of the wireless local area network;

combine the separate content data from the plurality of local computers;

communicate the combined content data to the remote control device for display on a display screen of the remote control device;

receive a user selection for playback from the remote control device that identifies selected media content and causing the selected media content to be played on the separate playback device; and at the playback unit, determine whether the display screen of the remote control device needs to be updated based on the user selection or the combined content data.

30. A system to control playback of digital media on a separate playback device via a wireless local area network, the system including:

playback means including:

at least one wireless network interface to communicate via the wireless local area network with a plurality of separate computers and to receive the digital media for playback, each separate computer including at least one media storage device;

a playback device interface to connect the playback means to the separate playback device to render the media to a user, the connection between the playback means and the playback device being independent of the wireless local area network;

a bi-directional remote control communication interface in addition to the wireless network interface; and a first processor configured to:

combine separate content data from the plurality of separate computers to provide the combined content data, and communicates the combined content data to a separate remote control means, the combined content data identifying the digital media available on the separate computers for playback via the playback means; and determine whether a display means of the remote control means need to be updated based on the combined content data; and the separate remote control means to control the playback of the digital media on the separate playback device via the playback means, the remote control means including:

a complemental remote control communication interface for bi-directional communication with the remote control communication interface of the playback means;

display means, wherein the remote control device receives combined content data from the playback means for display on the display means; and a second processor for determining whether the display means need to be updated based on the received combined content data.

31. A system to control playback of digital media on a playback device, the system including:

a playback unit including:

a digital media storage communication interface to communicate with a plurality of separate computers and to receive the digital media for playback, the plurality of separate computers being to provide the digital media to a plurality of playback units; and a playback device interface to connect the playback unit to the playback device to render the media to a user, the connection between the playback unit and the playback device being independent of the digital media storage communication interface;

a bi-directional remote control communication interface; and a first processor configured to:

combine separate content data from the plurality of separate computers to provide the combined content data, and communicates the combined content data to a separate remote control device, the combined content data identifying the digital media available on the separate computers; and determine whether a display screen of the remote control device needs to be updated based on the combined content data; and the separate remote control device to control the playback of the digital media on the playback device via the playback unit, the remote control device including:

a complemental remote control communication interface for bi-directional communication with the remote control communication interface of the playback unit;

the display screen, wherein the remote control device receives combined content data from the playback unit for display on the display screen; and a second processor for determining whether the display screen needs to be updated based on the received combined content data.

32. The system of claim 31, wherein the playback device is a device that is separate from the plurality of separate computers.

33. The system of claim 31, wherein the digital media storage communication interface is a wireless network interface to communicate with the plurality of separate computers via a wireless network, and multiple threads are used to communicate the digital content via the wireless network to the plurality of playback units.

34. The system of claim 31, wherein each playback unit requests media content from any of the separate computers in response to communications received from the remote control device.

* * * * *